United States Patent
Jia et al.

(10) Patent No.: US 12,270,819 B2
(45) Date of Patent: Apr. 8, 2025

(54) ULTRA-HIGH-SPEED FULLY AUTOMATIC PRECISION SPECTRAL ANALYSIS SYSTEM FOR RARE EARTH METALS AND WORKING METHOD THEREOF

(71) Applicant: NCS Testing Technology CO., LTD, Beijing (CN)

(72) Inventors: Yunhai Jia, Beijing (CN); Liangjing Yuan, Beijing (CN); Lei Yu, Beijing (CN); Chunyan Zhang, Beijing (CN); Qiaochu Zhang, Beijing (CN); Shaoyin Li, Beijing (CN); Cheng Jin, Beijing (CN); Xiaoke Hao, Beijing (CN)

(73) Assignee: NCS Testing Technology CO., LTD, Beijing (CN)

( * ) Notice: Subject to any disclaimer, the term of this patent is extended or adjusted under 35 U.S.C. 154(b) by 0 days.

(21) Appl. No.: 18/598,166

(22) Filed: Mar. 7, 2024

(65) Prior Publication Data
US 2024/0210433 A1    Jun. 27, 2024

(30) Foreign Application Priority Data
Sep. 7, 2023   (CN) .......................... 202311146047.4

(51) Int. Cl.
*G01N 35/04* (2006.01)
*G01N 1/28* (2006.01)
(Continued)

(52) U.S. Cl.
CPC ............. *G01N 35/04* (2013.01); *G01N 1/286* (2013.01); *G01N 21/67* (2013.01);
(Continued)

(58) Field of Classification Search
CPC ........ G01N 1/286; G01N 21/25; G01N 21/67; G01N 21/84; G01N 35/00584;
(Continued)

(56) References Cited

FOREIGN PATENT DOCUMENTS

| CN | 113019953 A | 6/2021 | |
| CN | 113504145 A | * 10/2021 | |
| CN | 113019953 B | * 7/2022 | ............... B07C 5/02 |

OTHER PUBLICATIONS

CNIPA, Notification of First Office Action for Chinese application CN202311146047.4, Oct. 19, 2023.
(Continued)

*Primary Examiner* — Matthew D Krcha
*Assistant Examiner* — Austin Q Le

(57) ABSTRACT

An ultra-high-speed fully automatic precision spectral analysis system for rare earth metals and its working method is disclosed. The system includes a central control server, a precision numerical control rotary table communicatively connected with the central control server, a sample loading-clamping device, an automatic weighing device, an automatic ranging device, an analyzing surface machining device, a rare-earth spark emission spectrometer, and an automatic marking device; the sample loading-clamping device is arranged to fix a test sample of a rare earth metal, the automatic weighing device is arranged to weigh the test sample in real time, and the automatic ranging device, the analyzing surface machining device, the rare-earth spark emission spectrometer, and the automatic marking device are set up around the precision numerical control rotary table to perform the corresponding work processes respectively.

6 Claims, 5 Drawing Sheets

(51) Int. Cl.
    *G01N 21/67* (2006.01)
    *G01N 35/00* (2006.01)
(52) U.S. Cl.
    CPC .............. *G01N 2001/2866* (2013.01); *G01N 2035/00188* (2013.01); *G01N 2035/00217* (2013.01); *G01N 2035/0441* (2013.01)
(58) Field of Classification Search
    CPC .......... G01N 35/04; G01N 2001/2866; G01N 2035/00188; G01N 2035/00217; G01N 2035/0441
    See application file for complete search history.

(56) References Cited

OTHER PUBLICATIONS

CNIPA, Notification to grant patent right for Chinese application CN202311146047.4, Nov. 15, 2023.

\* cited by examiner

ULTRA-HIGH-SPEED FULLY AUTOMATIC PRECISION SPECTRAL ANALYSIS SYSTEM FOR RARE EARTH METALS AND WORKING METHOD THEREOF

TECHNICAL FIELD

The present disclosure relates to the technical field of spectral analysis of rare earth metals, in particular, it relates to an ultra-high-speed fully automatic precision spectral analysis system for rare earth metals and its working method.

BACKGROUND ART

Rare earth metals and their alloys are the important basic materials of rare earth functional materials, known as the "vitamins of industry", with irreplaceable excellent magnetic, optical and electrical properties, which play a great role in improving product performance, increasing product variety and improving production efficiency.

Rare earth metal industry in the whole rare earth industry chain has an extremely important position, and has been widely used in electronic information, automobile manufacturing, aerospace, national defense and military industry and other fields. In the late twentieth century, the extensive application of rare earth materials such as permanent magnetic materials and hydrogen storage materials promote the rapid development of the rare earth industry as a basic raw material, the industrialization technology and equipment of rare earth metals have been improved continuously, and the industrialization process has been promoted rapidly, laying a solid raw material foundation for the high-quality development of advanced materials.

After years of development, China's rare earth metal smelting industry, relying on resource and cost advantages, has continuously improved the preparation technology and product quality, and formed a set of complete and mature process routes for the preparation of rare earth metals. In order to ensure product quality, the production of rare earth metals need to strictly control the impurity elements and realize the detection of each of blocks, and the detection process includes: surface machining, spectral analysis, marking and weighing and other procedures. The complex detection process, large detection volume, and heavy single block weight of rare earth metals result in the consumption of a large amount of manpower and time, which greatly restricts the production efficiency of the rare earth metal industry. Therefore, there is an urgent need for a fast automated means to solve this problem.

SUMMARY

The purpose of the present disclosure is to provide an ultra-high-speed fully automatic precision spectral analysis system for rare earth metals and its working method, which, compared with the traditional rare-earth metal detection process, eliminates a large number of manual processes, and the whole process is streamlined and controllable, and integrates five processes, namely, sample loading, automatic weighing, automatic ranging, surface machining, spectral analysis, and automatic marking, and can detect multiple samples at the same time, thus realizing the ultra-high-speed fully automatic spectral analysis; the system has a compact structure, accelerated tempo, accurate positioning, and greatly improves the analysis efficiency and precision, thereby improving the production quality.

In order to realize the above purpose, the present disclosure provides the following scheme:

An ultra-high-speed fully automatic precision spectral analysis system for rare earth metals includes: a central control server, a precision numerical control rotary table communicatively connected with the central control server, a sample loading-clamping device, an automatic weighing device, an automatic ranging device, an analyzing surface machining device, a rare-earth spark emission spectrometer, and an automatic marking device;

the sample loading-clamping device and automatic weighing device are set on the precision numerical control rotary table, the sample loading-clamping device is arranged for fixing a rare earth metal test sample; the automatic weighing device is arranged for weighing the test sample in real time and transmitting the weighing information to the central control server;

the automatic ranging device, analyzing surface machining device, rare-earth spark emission spectrometer, and automatic marking device are set around the precision numerical control rotary table;

the automatic ranging device is arranged for performing an automatic ranging process on a test sample;

the analyzing surface machining device is arranged for performing an analyzing surface machining process on the test sample;

the rare-earth spark emission spectrometer is arranged for performing a spectral analysis process on the test sample;

the automatic marking device is arranged for performing an automatic marking process on the test sample;

the precision numerical control rotary table drives the test sample to rotate to positions corresponding to different processes.

Further, the sample loading-clamping device includes multiple automatic fixtures, the multiple automatic fixtures are uniformly disposed on an upper surface of the precision numerical control rotary table.

Further, the automatic weighing device is mounted below the precision numerical control rotary table, the automatic weighing device includes an automatic rising-lowering weighing table and a pressure sensor set at a bottom of the automatic rising-lowering weighing table, the automatic rising-lowering weighing table passes through the precision numerical control rotary table and is located between the automatic fixtures of the sample loading-clamping device, which is arranged to weigh the test sample during loading and unloading; the automatic weighing device transmits the weighing information to a database of the central control server for storage.

Further, the automatic ranging device is arranged for determining a position of the analyzing surface of the test sample and measuring a height difference of the analyzing surface, and transmitting measurement results to the central control server, and the central control server determines a machining height of the analyzing surface, and the machining height is arranged for positioning a position and a depth of the analyzing surface machining in the analyzing surface machining process, as well as positioning a excitation position of the rare-earth spark emission spectrometer in the spectral analysis process.

Further, the analyzing surface machining device is mounted on X-axis and Z-axis of a high-precision three-dimensional motion system and is located on a top of the test sample on the precision numerical control rotary table, and the high-precision three-dimensional motion system controls the movement of the analyzing surface machining device along a direction of the X-axis and a direction of the Z-axis.

Further, an inert gas release device is provided at the center of a milling cutter of the analyzing surface machining device for releasing an inert gas as a protective gas during milling; multiple baffles are provided on the precision numerical control rotary table, the baffles half encircle the sample loading-clamping device, and multiple gimbaled gas ports are provided on the baffles to release high pressure gas after milling is completed for blowing waste chips to a waste chip box for collection.

Further, the rare-earth spark emission spectrometer is mounted on W-axis of the high-precision three-dimensional motion system and is located on a top of the test sample on the precision numerical control rotary table, and the high-precision three-dimensional motion system controls a movement of the rare-earth spark emission spectrometer along a direction of the W-axis.

The present disclosure also provides a working method of the ultra-high-speed fully automatic precision spectral analysis system for rare earth metals, including the following steps:

S1, automatic weighing process:
at the time of loading, weighing, by the automatic weighing device, the test sample at an initial station, and transmitting the weighing information to a database of the central control server for storage;

S2, sample loading-clamping process:
after weighing is completed, controlling, by the central control server, the sample loading-clamping device to clamp and fix the test sample;

S3, automatic ranging process:
after completing steps S1 and S2, driving, by the precision numerical control rotary table, the test sample to rotate to a corresponding station of the automatic ranging device, scanning, by the automatic ranging device, the surface of the test sample, determining a position of the analyzing surface of the test sample, and measuring a height difference of the analyzing surface, and transmitting measurement results to the central control server, determining, by the central control server, a machining height of the analyzing surface, wherein the machining height is arranged for positioning an analyzing surface machining position and a depth in the analyzing surface machining process, as well as positioning a excitation position of the rare-earth spark emission spectrometer in the spectral analysis process;

S4, analyzing surface machining process:
driving, by the precision numerical control rotary table, the test sample to rotate to a corresponding station of the analyzing surface machining device, and according to the positioning of the analyzing surface machining position and the depth in the analyzing surface machining process obtained in step S3, controlling, by the central control server, the analyzing surface machining device to move to the positioning position along the X-axis and Z-axis through the high-precision three-dimensional motion system, and machining, by the milling cutter, the analyzing surface of the test sample;

S5, spectral analysis process:
driving, by the precision numerical control rotary table, the test sample to rotate to the corresponding station of the rare earth spark emission spectrometer, and according to the positioning of the excitation position of the rare-earth spark emission spectrometer obtained in step S3, controlling, by the central control server, the rare-earth spark emission spectrometer to move to the excitation position along the W-axis through the high-precision three-dimensional motion system, contacting and pressing, by an excitation table, with the excitation position, and exciting the analyzing surface of the test sample to obtain the spectral analysis results, and transmitting the spectral analysis results to a supporting computer of the rare-earth spark emission spectrometer and synchronously transmitting the spectral analysis results to a database of the central control server for storage;

S6, automatic marking process:
driving, by the precision numerical control rotary table, the test sample to rotate to a corresponding station of the automatic marking device, and marking, by the automatic marking device, the surface of the test sample according to a marking number input by an operator in the central control server;

S7, automatic weighing process:
driving, by the precision numerical control rotary table, the test sample to rotate back to the initial station, controlling, by the central control server, the sample loading-clamping device to release the test sample, weighing, by the automatic weighing device, the test sample processed by S3-S6 to obtain the weighing information at the time of unloading, and transmitting the weighing information to the database of the central control server for storage; obtaining, by the central control server, a milling amount of the test sample based on the weighing information at the time of loading and unloading.

Further, in the step S1, at the time of loading, weighing, by the automatic weighing device, the test sample at an initial station specifically includes:
raising the automatic rising-lowering weighing table of the automatic weighing device and passing through the precision numerical control rotary table, and placing the test sample onto the automatic rising-lowering weighing table, and weighing by a pressure sensor at a bottom of the automatic rising-lowering weighing table.

In the step S2, after weighing is completed, the automatic rising-lowering weighing table is lowered into position and the automatic rising-lowering weighing table is lower than the precision numerical control rotary table;

In the step S7, weighing, by the automatic weighing device, the test sample processed by S3-S6 to obtain the weighing information at the time of unloading specifically includes:
raising the automatic rising-lowering weighing table of the automatic weighing device and passing through the precision numerical control rotary table, and placing the processed test sample onto the automatic rising-lowering weighing table, and weighing by a pressure sensor at a bottom of the automatic rising-lowering weighing table.

Further, the method further includes: placing the test samples into multiple automatic fixtures of the sample loading-clamping device in sequence, with the test samples on two adjacent automatic fixtures being in two processes of adjacent steps, and, the precision numerical control rotary table driving the test samples to rotate to a next process every set interval time.

According to the specific embodiments provided by the present disclosure, the present disclosure discloses the following technical effect: the ultra-high-speed fully automatic precision spectral analysis system for rare earth metals and its working method provided by the present disclosure integrates the processes of sample loading, real-time weighing, automatic ranging, surface machining, spectral analysis, automatic marking, etc., and the switching between different processes can be realized by the precision numerical control rotary table driving the test samples to rotate, and the multi-block test samples can be tested at the same time, with precise positioning, high accuracy, compact structure and accelerated pace.

Compared with the technical methods in the existing technology of rare-earth spark emission spectrometer alone, manually assisted detection, or with the help of robots to transfer samples to assist in the detection, the disclosure increases a number of functions, and eliminates the participation of the robot, the working time is greatly reduced, the error generated by the participation of the robot in the process is avoided, and the accuracy is greatly improved, which realizes the high efficiency of precision automated analysis of rare earth metals, saves cost at the same time greatly improves the analysis efficiency and precision, achieves the technical requirements of precise detection of each block of test samples, and then improves the quality of production.

DESCRIPTION OF THE ACCOMPANYING DRAWINGS

In order to more clearly illustrate the technical solutions in the embodiments or prior art of the present disclosure, the accompanying drawings to be used in the embodiments will be briefly introduced below, and it will be obvious that the accompanying drawings in the following description are only some of the embodiments of the present disclosure, and that for the person of ordinary skill in the field, other accompanying drawings can be obtained according to these drawings without paying creative labor.

Description of the accompanying markings: 1, precision numerical control rotary table; 2, sample loading-clamping device; 3, automatic weighing device; 3-1, automatic rising-lowering weighing table; 3-2, pressure sensor; 3-3, cylinder; 4, automatic ranging device; 5, analyzing surface machining device; 6, rare-earth spark emission spectrometer; 7, automatic marking device; 8, test sample.

DETAILED DESCRIPTION OF THE EMBODIMENTS

The technical solutions in the embodiments of the present disclosure will be clearly and completely described below in conjunction with the accompanying drawings in the embodiments of the present disclosure, and it is clear that the described embodiments are only a part of the embodiments of the present disclosure and not all of the embodiments. Based on the embodiments in the present disclosure, all other embodiments obtained by a person of ordinary skill in the art without making creative labor are within the scope of protection of the present disclosure.

It is an object of the present disclosure to provide an ultra-high-speed fully automatic precision spectral analysis system for rare earth metals and its working method, which, compared with the traditional rare-earth metal detection process, eliminates a large number of manual processes, and the whole process is streamlined and controllable, and integrates five processes, namely, sample loading, automatic weighing, automatic ranging, surface processing, spectral analysis, and automatic marking, and can detect multiple samples at the same time, thus realizing the ultra-high-speed fully automatic spectral analysis; the system has a compact structure, accelerated tempo, accurate positioning, and greatly improves the analysis efficiency and precision, thereby improving the production quality.

In order to make the above objects, features and advantages of the present disclosure more obvious and understandable, the present disclosure is described in further detail below in combination with the accompanying drawings and specific embodiments.

Figure 1:
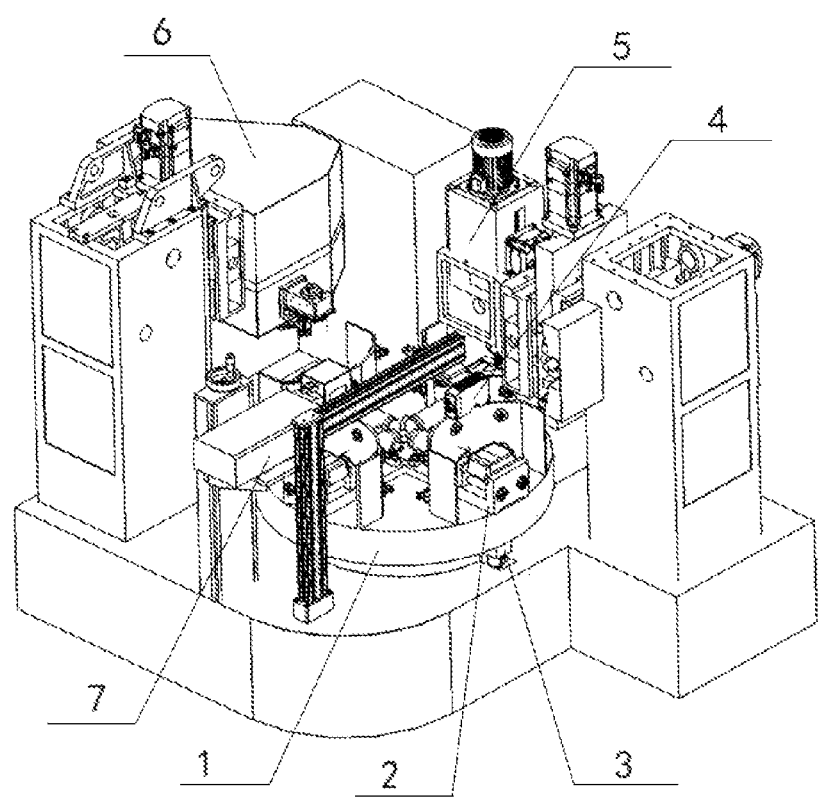
FIG. 1 shows a schematic diagram of the structure of an ultra-high-speed fully automatic precision spectral analysis system for rare earth metals provided by the present disclosure.
Figure 2:
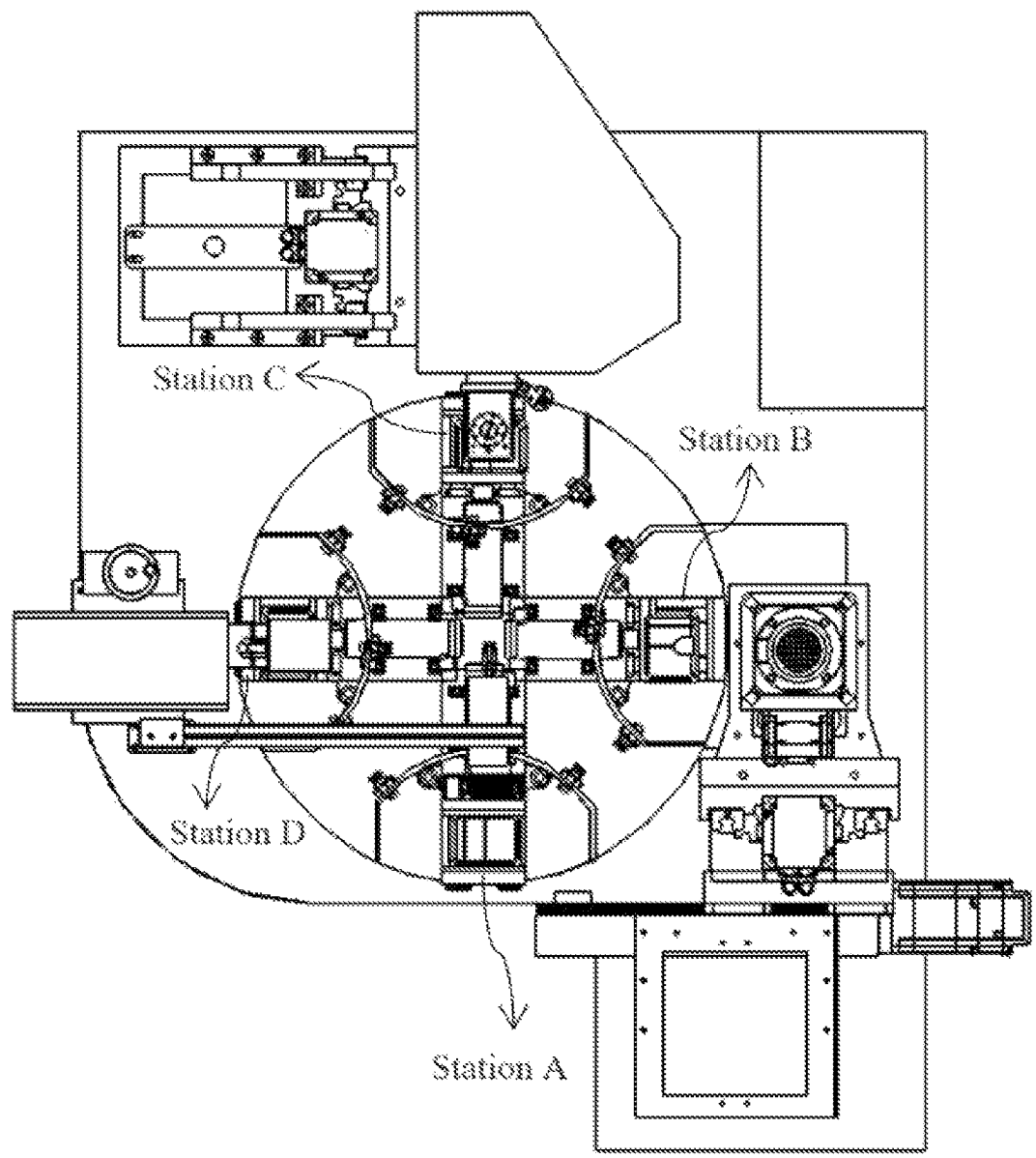
FIG. 2 shows a top view of a station layout of an ultra-high-speed fully automatic precision spectral analysis system for rare earth metals provided by the present disclosure.
Figure 3:
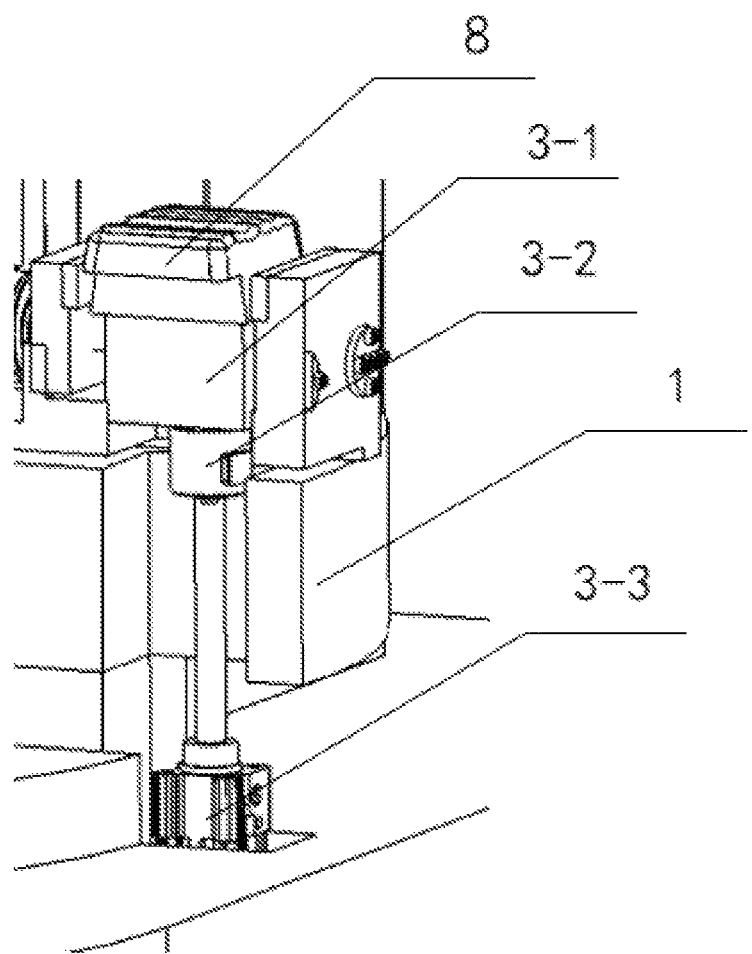
FIG. 3 shows a schematic diagram of the installation structure of an automatic weighing device provided by the present disclosure.

As shown in FIG. 1-FIG. 3, the present disclosure provides an ultra-high-speed fully automatic precision spectral analysis system for rare earth metals, including: a central control server, a precision numerical control rotary table 1 communicatively connected with the central control server, a sample loading-clamping device 2, an automatic weighing device 3, an automatic ranging device 4, an analyzing surface machining device 5, a rare-earth spark emission spectrometer 6, and an automatic marking device 7;

The sample loading-clamping device 2 and automatic weighing device 3 are set on the precision numerical control rotary table 1, the sample loading-clamping device 3 is arranged for fixing a rare earth metal test sample; the automatic weighing device 3 is arranged for weighing the test sample in real time and transmitting the weighing information to the central control server; specifically, the sample loading-clamping device 2 includes multiple automatic fixtures, the multiple automatic fixtures are uniformly disposed on an upper surface of the precision numerical control rotary table. Exemplarily, as shown in FIG. 2, the sample loading-clamping device 2 includes four automatic fixtures, corresponding to four stations, which can detect four test samples at the same time. The automatic fixtures include pneumatic, hydraulic and electric types. The automatic weighing device 3 is mounted below the precision numerical control rotary table 1, the automatic weighing device 3 includes an automatic rising-lowering weighing table and a pressure sensor set at a bottom of the automatic rising-lowering weighing table, the automatic rising-lowering weighing table passes through the precision numerical control rotary table 1 and is located between the automatic fixtures of the sample loading-clamping device 2, which is arranged to weigh the test sample during loading and unloading; the automatic weighing device 3 transmits the weighing information to a database of the central control server for storage. Exemplarily, the automatic rising-lowering weighing table rises during loading, the test samples are placed on the automatic rising-lowering weighing table by the robot or manually, after weighing, the automatic fixtures clamp the test samples, and the automatic rising-lowering weighing table is lowered and returned to its position. When unloading, the automatic rising-lowering weighing table rises to hold the sample, and then the automatic loading device releases the sample, so that the tested sample can be weighed, and after weighing is completed, the tested sample is taken away by a robot or manually.

Exemplarily, as shown in FIG. 3, the automatic rising-lowering weighing table 3-1 in the automatic weighing device 3 is driven by a cylinder 3-3, the pressure sensor 3-2 is set at the bottom of the automatic rising-lowering weighing table 3-1, and the test sample 8 is placed on the automatic rising-lowering weighing table 3-1; the precision numerical control rotary table 1 is provided with a through-hole corresponding to the position of the automatic rising-lowering weighing table 3-1.

The automatic ranging device 4, analyzing surface machining device 5, rare-earth spark emission spectrometer 6, and automatic marking device 7 are set around the precision numerical control rotary table; exemplarily, the automatic ranging device 4 adopts an automatic ranging instrument, the analyzing surface machining device 5 adopts a high-precision milling tool device, and the automatic marking device 7 adopts an automatic marking machine;

The automatic ranging device 4 is arranged for performing an automatic ranging process on a test sample; specifically, the automatic ranging device 4 is arranged to determine the position of the analyzing surface of the test sample and measure the height difference of the analyzing surface, transmit the measurement results to a central control server, and the central control server determines the machining height of the analyzing surface, the machining height is arranged for positioning a position and a depth of the analyzing surface machining in the surface machining process, as well as positioning a excitation position of the rare-earth spark emission spectrometer in the spectral analysis process.

Figure 5:
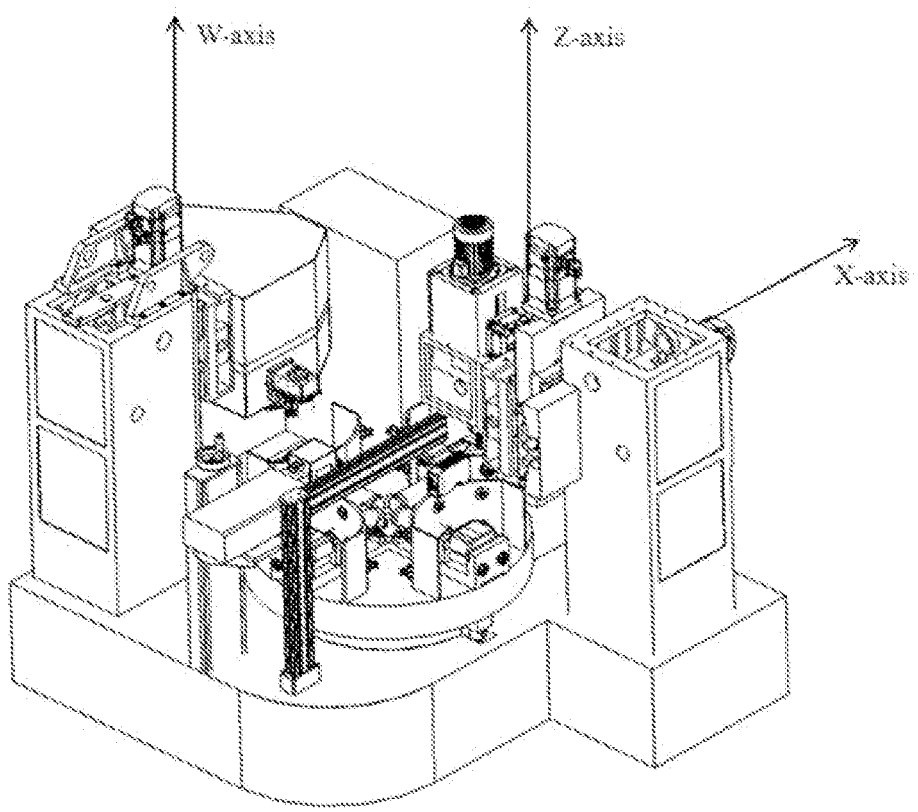
FIG. 5 shows a schematic diagram of the axis system direction of the high-precision three-dimensional motion system of the embodiment of the present disclosure.

The analyzing surface machining device 5 is arranged for performing an surface machining process on the test sample; specifically, the analyzing surface machining device 5 is mounted on X-axis and Z-axis of a high-precision three-dimensional motion system and is located on a top of the test sample on the precision numerical control rotary table, and the high-precision three-dimensional motion system controls the movement of the analyzing surface machining device along a direction of the X-axis and a direction of the Z-axis, which are shown in FIG. 5. Exemplarily, the high-precision three-dimensional motion system is a multi-axis numerical control system or a three-axis numerical control system. In addition, an inert gas release device is provided at the center of a milling cutter of the analyzing surface machining device 5 for releasing an inert gas as a protective gas during milling, which can prevent the combustion of waste chips and blow away the generated waste chips in time; multiple baffles are provided on the precision numerical control rotary table, the baffles half encircle the sample loading-clamping device, and multiple gimbaled gas ports are provided on the baffles to release high pressure gas after milling is completed for blowing waste chips to a waste chip box for collection.

The rare-earth spark emission spectrometer 6 is arranged for performing a spectral analysis process on the test sample; specifically, the rare-earth spark emission spectrometer is mounted on W-axis of the high-precision three-dimensional motion system and is located on a top of the test sample on the precision numerical control rotary table, and the high-precision three-dimensional motion system controls a movement of the rare-earth spark emission spectrometer along a direction of the W-axis, which is the same as the Z-axis as shown in FIG. 5, except that it is located on a different axis. In addition, a buffer device is provided inside the rare-earth spark emission spectrometer to convert the contact between the downward pressure of the excitation table and the sample into a soft contact for protecting the optical system of the rare-earth spark emission spectrometer from shifting; and one side of the excitation table is provided with an automatic electrode-cleaning device, and the electrode brushes are moved to clean up the electrodes after the excitation is completed.

The automatic marking device 7 is arranged for performing an automatic marking process on the test sample;

The precision numerical control rotary table 1 drives the test samples to rotate to positions corresponding to different processes. The precision numerical control rotary table 1 has a high-precision positioning capability and can perform actions at a set angle and time for sending a test sample at a station to the location of the next process.

As shown in FIG. 2, the present embodiment is set with four automatic fixtures corresponding to four work stations, and the rotation angle of the precision numerical control rotary table corresponding to the four work stations is set at 90°.

The sample loading-clamping device is installed on the precision numerical control rotary table, and the other devices are set around the rotary table. When setting up the four sample loading stations, here they are named in order: station A, station B, station C, station D, corresponding to automatic weighing, sample loading and automatic ranging process, analyzing surface machining process, spectral analysis process, and automatic marking process, respectively.

The four stations set the rotary table in four equal parts, so that the rotary table rotates 90° each time, and the rotation interval time (T) can be set according to requirements. The time required for the longest spectral analysis process is set as the interval time for rotating the rotary table: that is, the time from the start of the rare-earth spark emission spectrometer to the completion of the excitation, the excitation table is lifted to a safe height, and the interval time for rotating is set to be 35 s in this embodiment.

The sample loading-clamping process, automatic weighing process and automatic ranging process are carried out at station A, that is, the test sample is loaded at station A, clamped after weighing is completed, and ranging is carried out in situ after clamping is completed; the surface machining process is carried out at station B; the spectral analysis process is carried out at station C; the automatic marking process is carried out at station D; after marking is completed, the weighing and unloading is carried out at station A, that is, the test sample is again weighed when it returns to station A, and then the tested sample is taken away. At this point, the rotary table rotates for one cycle, and an analyzing process is finished.

The number of stations and the detection process can be flexibly set according to the demand, which not limited to the four stations and five processes herein, and the system is not limited to the detection of rare earth metal samples.

The rare earth metal is a single rare earth metal, a mixed rare earth metal or a rare earth alloy.

Figure 4:
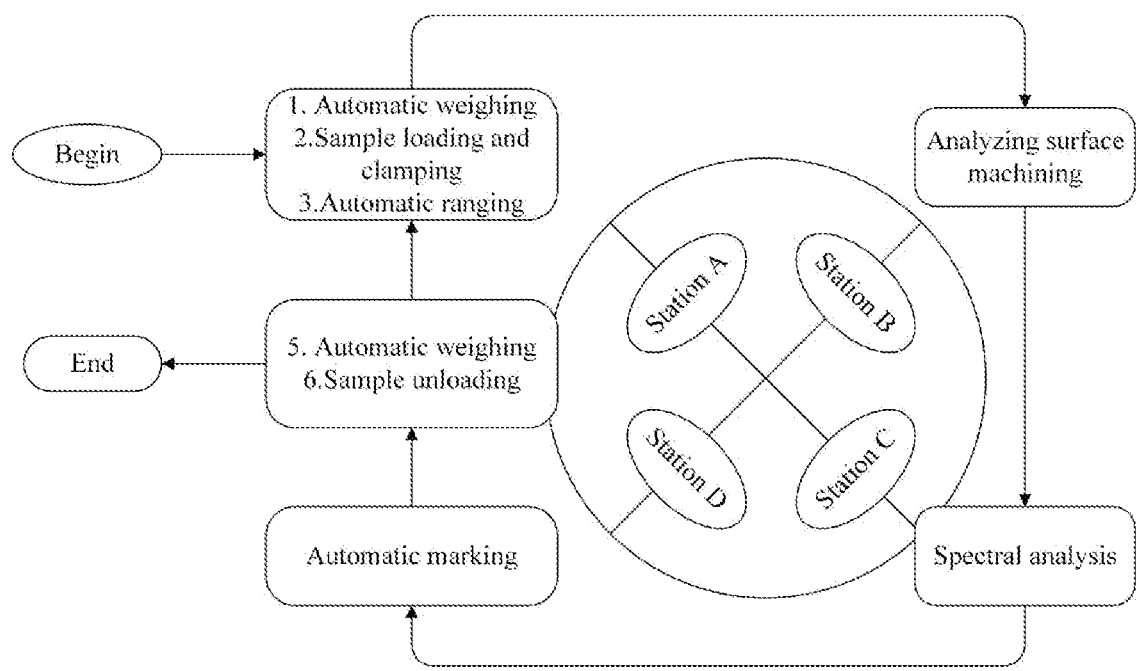
FIG. 4 is a flow chart of a working method of the ultra-high-speed fully automatic precision spectral analysis system for rare earth metals provided by the present disclosure.

As shown in FIG. 4, taking the scheme of four stations as a specific embodiment, the present disclosure provides a working method of the ultra-high-speed fully automatic precision spectral analysis system for rare earth metals, including the following steps:

S1, Automatic Weighing Process:

The automatic rising-lowering weighing table of the automatic weighing device rises up and is located directly above station A. The test sample No. 1 is placed on the weighing table by the robot or manually to obtain the weight of the test sample ($G_{Before-1}$) at the time of loading and the weight of the test sample is transmitted to the database of the central control server for storage.

S2, Sample Loading-Clamping Process:

After weighing is completed, the central control server controls the automatic fixtures at station A to clamp the test sample, and the automatic weighing device descends and returns to its position.

S3, Automatic Ranging Process:

S3.1

The automatic ranging device scans the surface of the test samples loaded and clamped on the station A to determine the position of the analyzing surface and measures the height difference (H1) of the analyzing surface, and the result is transmitted to the central server to determine the machining height of the analyzing surface.

S3.2,

After the ranging is completed, after waiting for 35 s, the central control server controls the action of the precision numerical control rotary table to rotate 90° and transfers the sample No. 1 to the station B.

At the same time, the test sample No. 2 is placed on the weighing table above the station A by the robot or manually for weighing ($G_{Before-2}$), after weighing is completed, the loading, clamping and automatic ranging (H2) is carried out, and wait after completion.

S4, Analyzing Surface Machining Process:

S4.1

The test sample No. 1 arrives at the station B, according to the positioning coordinates (X1, Z1) of the test sample No. 1 obtained by the analysis in step S3.1, the central control server controls the analyzing surface machining device to move to the positioning position along the X-axis and Z-axis through the high-precision three-dimensional motion system, and the milling cutter machines the analyzing surface.

S4.2

After the machining of the analyzing surface is completed, after waiting for 35 s, the central control server controls the action of the precision numerical control rotary table to rotate 90° and transfers the test sample No. 1 to the station C.

At the same time, the test sample No. 2 is transferred to the station B, according to the positioning coordinates (X2, Z2) of the test sample No. 2 obtained by the analysis in step S3.2, the central control server controls the analyzing surface machining device to move to the positioning position along the X-axis and Z-axis through the high-precision three-dimensional motion system, and the milling cutter machines the analyzing surface. After machining is completed, wait.

At the same time, the test sample No. 3 is placed on the weighing table above the station A by the robot or manually for weighing ($G_{Before-3}$), after weighing is completed, the loading, clamping and automatic ranging (H3) is carried out, and wait after completion.

S5, Spectral Analysis Process:

S5.1

The test sample No. 1 arrives at station C, according to the positioning coordinates (W1) of the test sample No. 1 obtained by the analysis in step S3.1, the central control server controls the rare-earth spark emission spectrometer to move to the excitation position along the W-axis through the high-precision three-dimensional motion system, the excitation table is contacted and pressed with the excitation position, and excitation is carried out on the analyzing surface of the sample. The analysis data are transmitted to the supporting computer of the rare-earth spark emission spectrometer, and the analysis results are synchronized to the database of the central control server for storage.

S5.2,

After the excitation is completed, the central control server controls the action of the precision numerical control rotary table to rotate 90° and transfers the sample No. 1 to the station D.

At the same time, the test sample No. 2 is transferred to station C, according to the positioning coordinates (W2) of the test sample No. 2 obtained by the analysis in step S3.2, the central control server controls the rare-earth spark emission spectrometer to move to the excitation position along the W-axis through the high-precision three-dimensional motion system for spectral analysis.

At the same time, the test sample No. 3 is transferred to the station B, according to the positioning coordinates (X3, Z3) of the test sample No. 3 obtained by the analysis in step S4.2, the central control server controls the analyzing surface machining device to move to the positioning position along the X-axis and Z-axis through the high-precision three-dimensional motion system, and the milling cutter machines the analyzing surface. After machining is completed, wait.

At the same time, the test sample No. 4 is placed on the weighing table above the station A by the robot or manually for weighing ($G_{Before-4}$), after weighing is completed, the loading, clamping and automatic ranging (H4) is carried out, and wait after completion.

S6. Automatic Marking Process:

S6.1

The test sample No. 1 arrives at station D, the automatic marking device marks the surface of the test sample No. 1 according to the marking number (000000001) entered by the operator in the central control server.

S6.2

After marking, after waiting for 35 s, the central control server controls the action of precision numerical control rotary table to rotates 90° and transfers the tested sample No. 1 to the station A.

After weighing is completed, after wait for 35 s, the central control server controls the action of the precision numerical control rotary table to rotates 90°, and transfers the tested sample No. 1 to the station A.

At the same time, the test sample No. 2 is transferred to the station D for automatic marking (00000002), after completion, wait.

At the same time, the test sample No. 3 is transferred to the station C, according to the positioning coordinates (W3) of the test sample No. 3 obtained by the analysis in step S4.2, the central control server controls the rare-earth spark emission spectrometer to move to the excitation position along the W-axis through the high-precision three-dimensional motion system for spectral analysis.

At the same time, the test sample No. 4 is transferred to the station B, according to the positioning coordinates (X4, Z4) of the test sample No. 4 obtained by the analysis in step S5.2, the central control server controls the analyzing surface machining device to move to the positioning position along the X-axis and Z-axis through the high-precision three-dimensional motion system, and the milling cutter machines the analyzing surface. After machining is completed, wait.

S7. Automatic Weighing

The test sample No. 1 arrives at the station A, the weighing table of the automatic weighing device rises to hold the sample, then the central control server controls the fixtures to release the tested sample No. 1, the tested sample No. 1 is weighed to obtain the weight ($G_{After-1}$) of the tested sample at the time of unloading, and the weight is transmitted to the database of the central control server for storage. And the milling amount ($G=G_{After-1}-G_{Before-1}$) of the sample can be calculated by collecting the weight of the loaded sample and unloaded sample.

S8. Sample Unloading

After weighing is completed, the tested sample No. 1 (00000001) is removed from the weighing table by the robot or manually.

At this point, an analysis process is completed. The analysis process of the tested sample No. 1 is completed, the test sample No. 2 has completed the automatic marking process, the teste sample No. 3 has completed the spectral analysis process, and the test sample No. 4 has completed the surface machining process. In this way, the cycle of continuous analysis of multiple test samples is realized.

For the program of four stations, each station completes a process, after waiting for 35 s, the central control server controls the precision numerical control rotary table to rotates 90°, so that each station moves on to the next process, it can be seen, the present disclosure can realize the automatic control of the process switching every 35 s. In addition, for different number of stations, the control cycle and rotation angle can be adjusted according to the actual demand.

In summary, the present disclosure provides an ultra-high-speed fully automatic precision spectral analysis system for rare earth metals and its working method, including a central control server, a precision numerical control rotary table, an automatic weighing device, a sample loading-clamping device, an automatic ranging device, an analyzing surface machining device, a rare-earth spark emission spectrometer, and an automatic marking device. Four sample loading stations are set up in four equal parts on the precision numerical control rotary table, each station can fix a rare earth metal sample, and the sample on the station can be sent to the next process location through the rotation of the rotary table, so that four samples can be detected at the same time. The disclosure integrates sample loading, real-time weighing, automatic ranging, surface machining, spectral analysis, automatic marking and other processes, with simultaneous detection of multiple samples, precise positioning, high accuracy, compact structure, accelerated tempo, which greatly improves the efficiency and accuracy of the analysis, and realizes the high-efficiency automated analysis of rare earth metals.

In this paper, the application of specific examples of the principles and implementation of the present disclosure, the above description of the embodiment is only arranged to help understand the method of the present disclosure and its core ideas; at the same time, for the general technical personnel in the field, based on the ideas of the present disclosure, in the specific implementation of the disclosure and the scope of application of the specific implementation of the disclosure will have to change the place. In summary, the contents of this specification should not be construed as a limitation of the present disclosure.

What is claimed is:

1. An ultra-high-speed fully automatic precision spectral analysis system for rare earth metals, characterized in that it comprises:
   a central control server, a precision numerical control rotary table communicatively connected with the central control server, a sample loading-clamping device, an automatic weighing device, an automatic ranging device, an analyzing surface machining device, a rare-earth spark emission spectrometer, and an automatic marking device;
   the sample loading-clamping device is set on the precision numerical control rotary table, the sample loading-clamping device is arranged for fixing a rare earth metal test sample; the automatic weighing device is arranged for weighing the test sample in real time and transmitting the weighing information to the central control server;
   specifically, the sample loading-clamping device comprises a plurality of automatic fixtures, the plurality of automatic fixtures are uniformly disposed on an upper surface of the precision numerical control rotary table; the automatic weighing device is mounted below the precision numerical control rotary table, the automatic weighing device comprises an automatic rising-lowering weighing table and a pressure sensor set at a bottom of the automatic rising-lowering weighing table, the automatic rising-lowering weighing table passes through the precision numerical control rotary table and is located between the automatic fixtures of the sample loading-clamping device, which is arranged to weigh the test sample during loading and unloading; the automatic weighing device transmits the weighing information to a database of the central control server for storage;
   the automatic ranging device, the analyzing surface machining device, the rare-earth spark emission spectrometer, and the automatic marking device are set around the precision numerical control rotary table;
   the automatic ranging device is arranged for performing an automatic ranging process on a test sample;
   the analyzing surface machining device is arranged for performing an analyzing surface machining process on the test sample;
   the rare-earth spark emission spectrometer is arranged for performing a spectral analysis process on the test sample;
   the automatic marking device is arranged for performing an automatic marking process on the test sample;
   the precision numerical control rotary table drives the test sample to rotate to positions wherein the analyzing surface machining device is mounted on X-axis and Z-axis of a high-precision three-dimensional motion system and is located on a top of the test sample on the precision numerical control rotary table, and the high-precision three-dimensional motion system controls the movement of the analyzing surface machining device along a direction of the X-axis and a direction of the Z-axis.

2. The ultra-high-speed fully automatic precision spectral analysis system for rare earth metals according to claim 1, characterized in that the automatic ranging device is arranged for determining a position of the analyzing surface of the test sample and measuring a height difference of the analyzing surface, and transmitting measurement results to the central control server, and the central control server determines a machining height of the analyzing surface, and the machining height is arranged for positioning a position and a depth of the analyzing surface machining in the analyzing surface machining process, as well as positioning a excitation position of the rare-earth spark emission spectrometer in the spectral analysis process.

3. The ultra-high-speed fully automatic precision spectral analysis system for rare earth metals according to claim 1, characterized in that an inert gas release device is provided at the center of a milling cutter of the analyzing surface machining device for releasing an inert gas as a protective gas during milling; a plurality of baffles are provided on the precision numerical control rotary table, the baffles half encircle the sample loading-clamping device, and a plurality of gimbaled gas ports are provided on the baffles to release high pressure gas after milling is completed for blowing waste chips to a waste chip box for collection.

4. The ultra-high-speed fully automatic precision spectral analysis system for rare earth metals according to claim 1, characterized in that the rare-earth spark emission spectrometer is mounted on W-axis of the high-precision three-dimensional motion system and is located on a top of the test sample on the precision numerical control rotary table, and the high-precision three-dimensional motion system controls a movement of the rare-earth spark emission spectrometer along a direction of the W-axis.

5. A working method of the ultra-high-speed fully automatic precision spectral analysis system for rare earth metals as claimed in claim 1, characterized in that it comprises the following steps:

S1, automatic weighing process:
at the time of loading, weighing, by the automatic weighing device, the test sample at an initial station, and transmitting the weighing information to a database of the central control server for storage;

S2, sample loading-clamping process:
after weighing is completed, controlling, by the central control server, the sample loading-clamping device to clamp and fix the test sample;

S3, automatic ranging process:
after completing steps S1 and S2, driving, by the precision numerical control rotary table, the test sample to rotate to a corresponding station of the automatic ranging device, scanning, by the automatic ranging device, the surface of the test sample, determining a position of the analyzing surface of the test sample, and measuring a height difference of the analyzing surface, and transmitting measurement results to the central control server, determining, by the central control server, a machining height of the analyzing surface, wherein the machining height is arranged for positioning an analyzing surface machining position and a depth in the analyzing surface machining process, as well as positioning a excitation position of the rare-earth spark emission spectrometer in the spectral analysis process;

S4, analyzing surface machining process:
driving, by the precision numerical control rotary table, the test sample to rotate to a corresponding station of the analyzing surface machining device, and according to the positioning of the analyzing surface machining position and the depth in the analyzing surface machining process obtained in step S3, controlling, by the central control server, the analyzing surface machining device to move to the positioning position along the X-axis and Z-axis through the high-precision three-dimensional motion system, and machining, by the milling cutter, the analyzing surface of the test sample;

S5, spectral analysis process:
driving, by the precision numerical control rotary table, the test sample to rotate to the corresponding station of the rare earth spark emission spectrometer, and according to the positioning of the excitation position of the rare-earth spark emission spectrometer obtained in step S3, controlling, by the central control server, the rare-earth spark emission spectrometer to move to the excitation position along the W-axis through the high-precision three-dimensional motion system, contacting and pressing, by an excitation table, with the excitation position, and exciting the analyzing surface of the test sample to obtain the spectral analysis results, and transmitting the spectral analysis results to a supporting computer of the rare-earth spark emission spectrometer and synchronously transmitting the spectral analysis results to a database of the central control server for storage;

S6, automatic marking process:
driving, by the precision numerical control rotary table, the test sample to rotate to a corresponding station of the automatic marking device, and marking, by the automatic marking device, surface of the test sample according to a marking number input by an operator in the central control server;

S7, automatic weighing process:
driving, by the precision numerical control rotary table, the test sample to rotate back to the initial station, controlling, by the central control server, the sample loading-clamping device to release the test sample, weighing, by the automatic weighing device, the test sample processed by S3-S6 to obtain the weighing information at the time of unloading, and transmitting the weighing information to the database of the central control server for storage;

obtaining, by the central control server, a milling amount of the test sample based on the weighing information at the time of loading and unloading;

wherein, in the step S1, at the time of loading, weighing, by the automatic weighing device, the test sample at an initial station specifically comprises:
raising the automatic rising-lowering weighing table of the automatic weighing device and passing through the precision numerical control rotary table, and placing the test sample onto the automatic rising-lowering weighing table, and weighing by a pressure sensor at a bottom of the automatic rising-lowering weighing table;

in the step S2, after weighing is completed, the automatic rising-lowering weighing table is lowered into position and the automatic rising-lowering weighing table is lower than the precision numerical control rotary table;

in the step S7, weighing, by the automatic weighing device, the test sample processed by S3-S6 to obtain the weighing information at the time of unloading specifically comprises:
raising the automatic rising-lowering weighing table of the automatic weighing device and passing through the precision numerical control rotary table, and placing the processed test sample onto the automatic rising-lowering weighing table, and weighing by a pressure sensor at a bottom of the automatic rising-lowering weighing table.

6. The working method of the ultra-high-speed fully automatic precision spectral analysis system for rare earth metals according to claim 5, characterized in that the method further comprises, placing the test samples into a plurality of automatic fixtures of the sample loading-clamping device in sequence, with the test samples on two adjacent automatic fixtures being in two processes of adjacent steps, and, the precision numerical control rotary table driving the test samples to rotate to a next process every set interval time.

\* \* \* \* \*